Patented Oct. 17, 1933

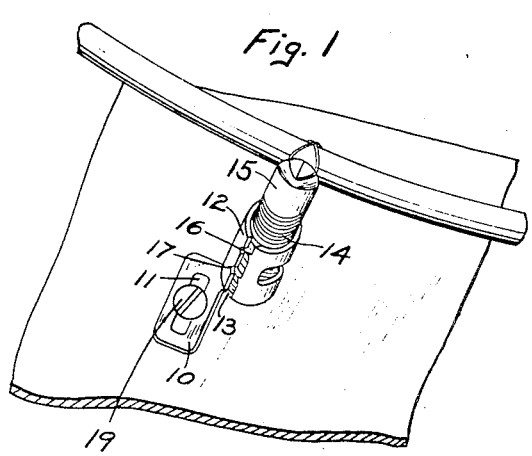
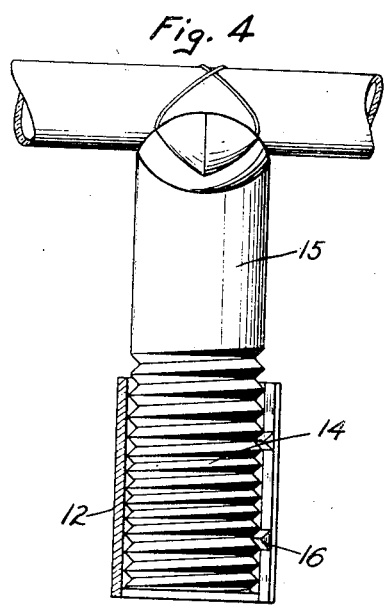
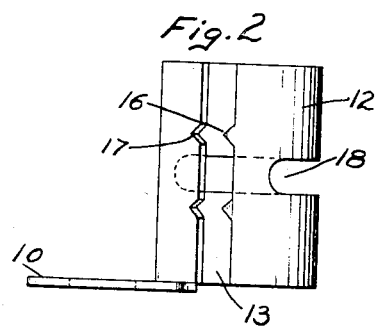
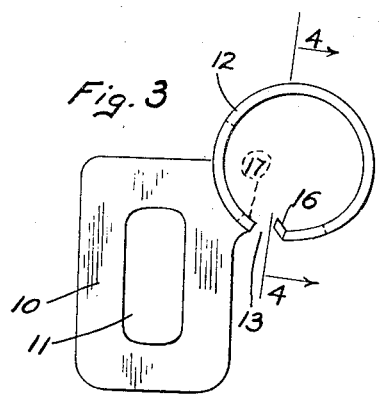
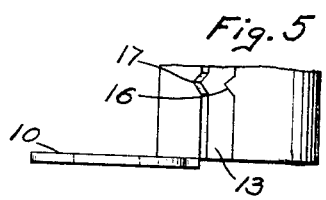

1,930,840

UNITED STATES PATENT OFFICE 1,930,840

NEON SIGN HOOK BASE

Lyle R. Mallette and Cornelius P. O'Keefe, Los Angeles, Calif., assignors to A. H. Forger & Co., Los Angeles, Calif.

Application February 5, 1930, Serial No. 426,175
Renewed October 24, 1932

4 Claims. (Cl. 248—30)

This invention relates to a hook base for neon signs. A so called hook is now in general use for supporting the tubing in neon signs, which hook is in the form of a crotched member having a shank with threads molded thereon.

The present invention contemplates a base for supporting the hook which provides a ferrule which receives the shank of the hook and which provides a suitable construction complementary to the threads on the shank so that the hook may be screwed into or out of the base to adjust its height.

Another object of the invention is to provide a base for supporting hooks employed in neon sign construction which is of relatively simple construction and which is formed from a single stamping or section of sheet metal.

A further object of the invention is to provide a hook base for neon signs which may have its height reduced for a purpose hereinafter to be described.

With the foregoing and other objects in view, which will be made manifest in the following detailed description, and specifically pointed out in the appended claims, reference is had to the accompanying drawing for an illustrative embodiment of the invention, wherein:

Fig. 1 is a perspective view of the improved hook base illustrating it as supporting a hook in applied position.

Fig. 2 is a side elevation of the hook base.

Fig. 3 is a top plan view of the hook base.

Fig. 4 is a sectional view taken substantially upon the line 4—4 upon Fig. 3.

Fig. 5 is a side elevation of a hook base which has been reduced in height.

Referring to the accompanying drawing, wherein similar reference characters designate similar parts throughout, the improved hook base comprises a single piece of sheet metal shaped and bent to form an approximately rectangular base part 10, having an elongated slot or aperture 11 formed therein. Near one corner of this rectangular base there is formed an extension which is bent to form a split ferrule 12, the split being indicated at 13. The parts are so arranged that the plane of the base 10 is substantially perpendicular to the longitudinal axis through the ferrule and the split 13 occurs adjacent a side edge of the base. By virtue of the fact that the hook base is formed of sheet metal, the split ferrule 12 is slightly resilient and can be caused to effectively clamp or grip the sides of the threaded shank 14 of the hook 15. On one side of the split 13 there are formed one or more V shaped projections or prongs 16. The sides of these V shaped projections are formed so as to be complementary to the sides of the threads formed on the shank of the hook.

In stamping out the blanks which form the improved hook base from a large flat sheet of metal, the blanks are so arranged that the prongs 16 are cut from the metal of an adjacent blank so that each blank will have therein notches 17 on the opposite side of the split. The presence or absence of the notches 17 forms no material part of the present invention, these notches being merely present when the blanks are stamped out in such a manner as to have the minimum amount of waste material. A horizontal slot 18 is formed in the split ferrule 12 at about its center.

The operation and advantages of the improved hook base are as follows. The base can be applied to a suitable supporting structure by driving a screw or similar fastening element, as indicated at 19, through slot 11 into the supporting structure. The screw being smaller than the slot will enable the hook base to be adjusted laterally and to be rotated thereabout in desired position just prior to tightening the screw home. The hook 15 can then be inserted into the ferrule by spreading the ferrule slightly. On releasing the ferrule it will effectively clamp and embrace the sides of the shank by virtue of its resiliency. The prongs or projections 16 which are bent inwardly, as clearly shown on Figure 3, enter the threads on the shank and thus form a construction complementary to the threads on the shank. By rotating the hook 15 it can be screwed into or out of the ferrule so that its effective height with respect to the supporting structure can be adjusted or varied.

In some installations it is customary to reversely bend the tubing of the neon sign, with the reversely bent portion disposed immediately behind the forward portion. This reversely bent portion may in these constructions be positioned very close to the supporting structure and in some instances will be so close that the hook base shown in Figures 1 to 4 inclusive is too high. In such instances the upper half of the ferrule may be cut off. The remaining structure after cutting off the upper half is shown in Figure 5. As clearly shown in this figure one of the prongs 16 is located below horizontal slot 18 so as to have at least one prong present to engage the threads after the upper half has been removed.

From the above described construction it will be appreciated that a simple, durable, and economical hook base is provided which will effectively support a hook for neon signs and provide for substantially universal adjustment of the same.

Various changes may be made in the details of construction without departing from the spirit or scope of the invention as defined by the appended claims.

We claim:

1. A device of the class described comprising a single section of sheet metal bent and shaped to provide an apertured base, and a split resilient ferrule, said ferrule having one or more inwardly bent projections on one side of the split as and for the purpose described.

2. A device of the class described comprising a single section of sheet metal bent and shaped to provide an apertured base, and a split resilient ferrule, said ferrule having one or more inwardly bent projections on one side of the split as and for the purpose described, said base being arranged in a plane perpendicular to the axis of the ferrule, there being a horizontal slot formed in the ferrule.

3. A device for mounting luminous gaseous discharge tubes upon and in spaced relation to a backing plate, comprising a bracket member having a foot portion, a split socket portion integral with said foot portion and disposed substantially at right angles thereto, one or more thread engageable members projecting inwardly from said socket portion, a threaded post adapted to enter said socket and have threaded engagement with the thread engageable member thereon and one end of said post being provided with a seat for the reception of a luminous tube.

4. In a device for mounting luminous gaseous discharge tubes upon and in spaced relation to a backing plate, the combination with a threaded post provided at one end with a seat for the reception of a luminous tube, a split socket for the reception of the shank of said post, said socket having an inwardly presented projection for engaging the threaded shank of the post and a foot portion formed integral with and projecting at right angles from one end of said socket for attachment to a support.

L. R. MALLETTE.
C. P. O'KEEFE.